(12) United States Patent
Lin et al.

(10) Patent No.: US 6,854,713 B2
(45) Date of Patent: Feb. 15, 2005

(54) DIAPHRAGM VALVE

(75) Inventors: Chun-Hung Lin, Hsinchu (TW);
Chen-Der Tsai, Hsinchu (TW);
Chin-Ching Wu, Hsinchu (TW);
Jung-Chen Ho, Hsinchu (TW);
Hann-Tsong Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 37 days.

(21) Appl. No.: 10/394,001

(22) Filed: Mar. 24, 2003

(65) Prior Publication Data

US 2004/0108485 A1 Jun. 10, 2004

(30) Foreign Application Priority Data

Dec. 6, 2002 (TW) ........................................ 91219830 U

(51) Int. Cl.⁷ ................................................ F16K 7/12
(52) U.S. Cl. ...................................... 251/331; 251/358
(58) Field of Search ................................ 251/331, 358, 251/359, 360; 92/103 F, 103 M, 103 R

(56) References Cited

U.S. PATENT DOCUMENTS

| 4,044,793 | A | * | 8/1977 | Krueger et al. ............. 137/881 |
|---|---|---|---|---|
| 4,446,886 | A | * | 5/1984 | Taylor et al. ............ 137/516.29 |
| 4,750,709 | A | * | 6/1988 | Kolenc et al. ............. 251/335.2 |
| 5,108,069 | A | * | 4/1992 | Tada et al. ..................... 251/58 |
| 5,186,434 | A | * | 2/1993 | Nishimura et al. .......... 251/331 |
| 5,335,691 | A | * | 8/1994 | Kolenc ....................... 137/312 |
| 5,485,984 | A | | 1/1996 | Itoi et al. |
| 5,730,423 | A | | 3/1998 | Wu et al. |
| 6,092,550 | A | | 7/2000 | Gotch et al. |

* cited by examiner

*Primary Examiner*—Edward K. Look
*Assistant Examiner*—John K. Fristoe, Jr.
(74) *Attorney, Agent, or Firm*—Rabin & Berdo, P.C.

(57) ABSTRACT

The diaphragm valve uses a metal dish-type diaphragm set to control the inflow and outflow of fluid. The metal dish-type diaphragm set is above an air flow channel to control the stem above the metal dish-type diaphragm set, and the air will be blocked by pressing the metal dish-type diaphragm to make it fit the metal valve base in the air flow channel; this non-metal valve base is fixed in the air flow channel by a fixed shrunk ring with a taper cross section, and the in-between metal diaphragm in the metal dish-type diaphragm set is annular in the center to reduce the metallic friction between metal diaphragms, to increase application times and to lower the leakage rate of the diaphragm valve.

14 Claims, 3 Drawing Sheets

DIAPHRAGM VALVE

FIELD OF THE INVENTION

The invention relates to a diaphragm valve, which uses a metal dish-type diaphragm set to control the inflow and outflow of fluid.

BACKGROUND OF THE INVENTION

A "valve" is a functional unit with moveable switches, and used to control the flowing, pausing, flow quantity and pressure of fluid in pipelines. Its functions break into five parts: (1) a front-and a back part (2) an adjustment of the flow quantity (3) prevention of the countercurrent flow (4) the alteration of the flow direction and (5) pressure-control of fluid.

For life-related tap water, gases in semiconductor plants and chemicals, food or products of petrifaction plants, valves are needed to adjust the flow quantity of a fluid, to control the flow rate and pressure or to control its fluid-acceptance as long as the fluid is conveyed by pipelines. Thus, we see that the valve is an indispensable part in the semiconductor industry, chemical industry and food industry.

The internal surface of pipes, used to transport fluid bodies, mostly goes through lapped finishing or electrolytic polishing for high cleanness and anticorrosion. Advanced integrated circuits, LCD, III–V industry and so on have stricter standards on the cleanness, anticorrosion and gas leakage rate.

To reduce the leakage rate of fluid bodies in pipes, many types of valves are developed to control the on and off state of fluid bodies, for instance:

1. The American U.S. Pat. No. 5,730,423 reveals a metal diaphragm valve, wherein an annular sealing base is set on the inlet of a valve chamber. The diaphragm is made of springy metal and dish-shaped. When not pressed, the diaphragm does not touch the sealing base; while pressed, it shall be deformed to contact the sealing base for sealing. The diaphragm directly contacting the annular sealing base is made of hard steel, while the diaphragm next to it is made of soft metal. This diaphragm valve is designed to achieve driving fit by pressing metal surfaces together, but dust particles are easily generated, due to metal frictions, thus it fails to meet the requirements of super cleanness.
2. The American U.S. Pat. No. 6,092,550 reveals a diaphragm valve, which controls the inflow and outflow of fluid bodies by using the driving fit between diaphragms and a non-metal axle ring, instead of a metal one. First, put a metal axle ring on the inlet of air in-flow channel, then set a non-metal axle ring around the above-mentioned metal one. Below the non-metal axle ring, the metal axle ring is deformed by a clamp device and fit with the non-metal axle ring by way of rivet connection. The negative part of this is, that the metal axle ring and non-metal axle ring are not maintainable or replaceable, and the fitting of them is likely to cause surface scuffing and to damage their anticorrosion and cleanness.
3. American U.S. Pat. No. 5,485,984 reveals a diaphragm valve, which adopts a removable sealing metal ring that contains an input channel and an output channel of fluid bodies. The part contacting with machines is made of synthetic resin for sealing. This diaphragm valve is easy to install and maintain; yet there are difficulties in tolerance matching and slipping positioning in case of production and assembly, for the sealing structure of the valve body is a removable metal ring, and it is not suitable for production in large quantities.

SUMMARY OF THE INVENTION

In consideration of the above-mentioned problems, this invention provides a diaphragm valve sealing design on semiconductor level and an improved design of a metal dish-type diaphragm set. This diaphragm valve conforms to the requirements of electrolytic polishing technology on semiconductor level and the improved metal dish-type diaphragm set is able to lower the leakage rate and increase the application times of metal diaphragms, as well as to achieve the goal of super cleanness.

This invention relates to a diaphragm valve, which uses a metal dish-type diaphragm set to control the inflow and outflow of fluid bodies. The metal dish-type diaphragm set is above an air flow channel to control the stem above the metal dish-type diaphragm set, and the air will be blocked by pressing the metal dish-type diaphragm set for driving fit with the metal valve base in the air flow channel;

This non-metal valve base is fixed in the air flow channel through a fixed shrunk ring with a taper cross section to reduce its leakage rate, and the in-between diaphragm of the metal dish-type diaphragm set is annular in the center to reduce the frictions between metal diaphragms, to increase its application times and to lower the leakage rate of the diaphragm valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
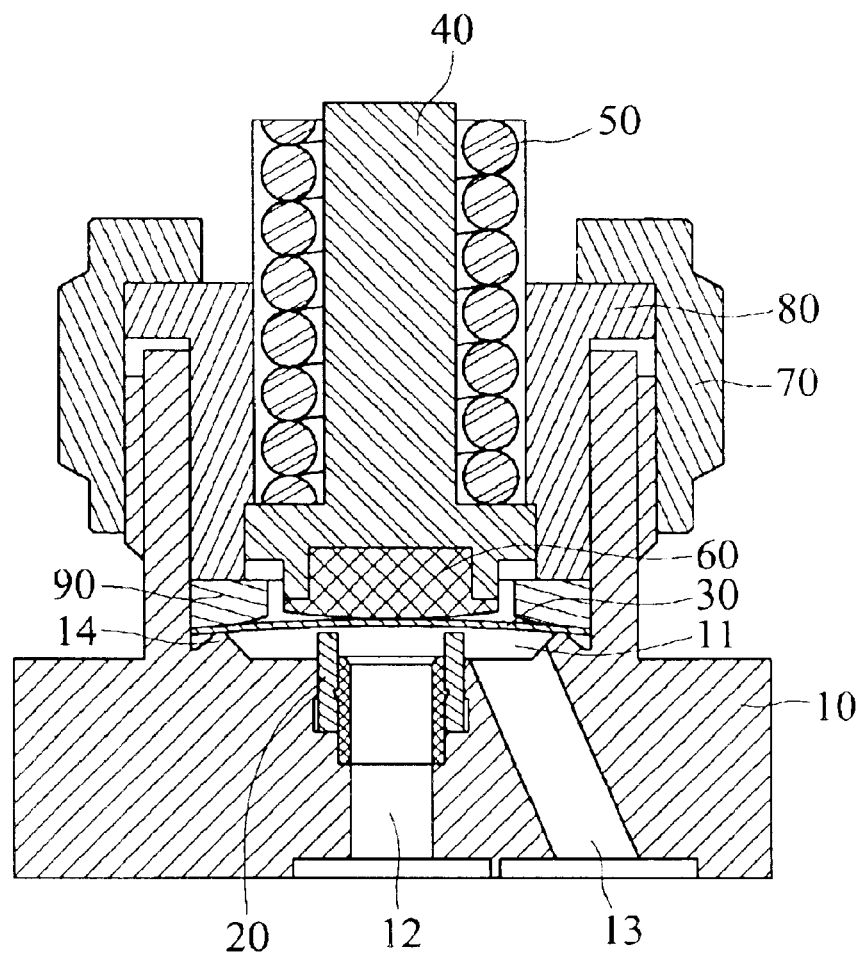
FIG. 1 is a lateral view of the diaphragm valve of the invention.

FIG 1 is a lateral view of the diaphragm valve in the invention and is provided with a valve body 10, inside of which is a chamber 11, the first flow channel 12 for air inflow and the second flow channel 13 for air outflow.

In the first flow channel 12, a non-metal valve base 20 is set near the chamber 11, and above it is the metal dish-type diaphragm set 30 controlling air inflow and outflow, which is made of springy metal.

When you want to block the air-inflow, move the stem 40 downward by controlling the spring 50 and pneumatic system interlocked with stem 40. The stem 40 will drive the presser 60 to press the metal dish-type diaphragm set 30 underneath, which will press against the non-metal valve base 20, thus blocking air inflow.

On the contrary, when you want air outflow, separate the presser 60 and metal dish-type diaphragm set 30 by controlling the spring 50 and the pneumatic system (not shown in figures), and when the metal dish-type diaphragm set 30 is free from downward pressure of presser 60, it will be disconnected from the non-metal valve base 50 and air gets through.

To reduce the inboard leakage of the diaphragm valve, fasten the screw nuts 70 in the periphery of the valve body 10, which drives the back up block 80 downward to press against the ring bonnet 90, so that the outer edge of metal dish-type diaphragm set 30 and the flange 14 of the valve body 10 are pressed to deform the metal dish-type diaphragm set 30, to achieve sealing. Thus, outside air or dust can't get into the highly clean air channel, the leakage rate is reduced and outboard leakage is avoided to ensure the safety of workers.

Figure 2:
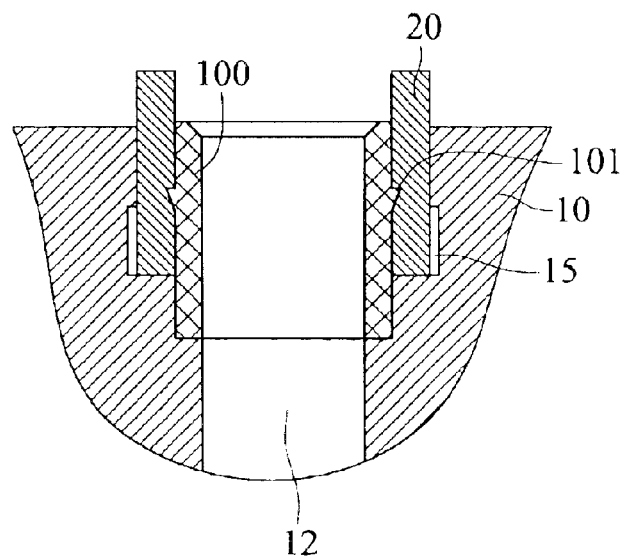
FIG. 2 is a lateral view of the combination of non-metal valve base and fixed shrunk ring.

The above-mentioned metal valve base 20 is made of deformable materials, for example, polychlorotrifluoroethylene or other plastic materials, and is a little higher than the internal surface of the valve body 10. Referring to FIG.2, the way of fixing the non-metal valve base 20 in the first flow channel 12 is shown. First, place the non-metal valve base 20 in the groove 15 of the valve body 10, then press the fixed shrunk ring 100 into the non-metal valve base 20 from above with a proper clamp device. The section plane of the fixed shrunk ring 100 is a taper, and it shall pull off the non-metal valve base 20 and fix it in the first flow channel 12; in designing the groove 15, a space shall be reserved for expansion of the non-metal valve base 20 after being pressed by the fixed shrunk ring 100, and the base shall be tightly fit with the first flow channel 12.

On the outer edge of the fixed shrunk ring 100, one or more flanges 101 can be added to prevent the drop out of metal valve base 20, and to fit the non-metal valve base 20 and the first flow channel 12 better. It also meets the demand of cleanness.

Figure 3:
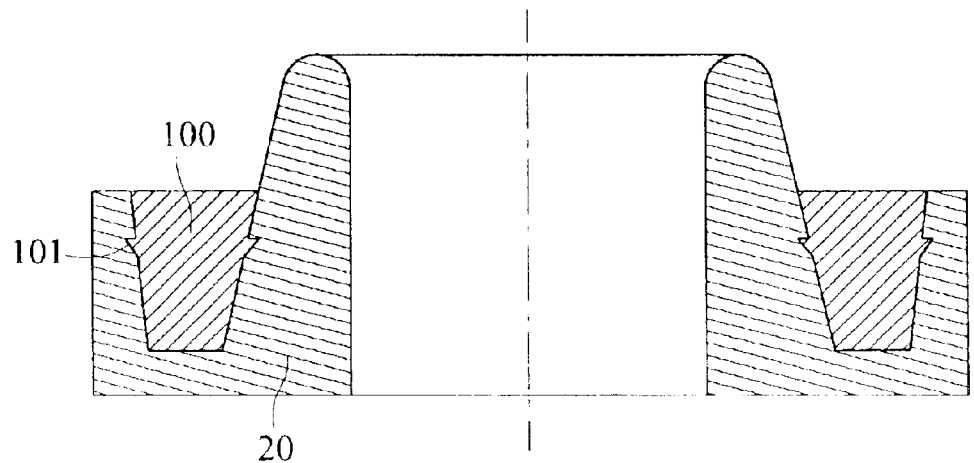
FIG. 3 is another lateral view of the combination of non-metal valve base and fixed shrunk ring.

Referring to FIG. 3 for another section drawing of the combination of a non-metal valve base 20 and a fixed shrunk ring 100. Making the non-metal valve base 20 a concentric ring with grooves, and then place the fixed shrunk ring 100 with a taper section into the groove of non-metal valve base 20 for pressing combination. Flanges 101 are added to the periphery of the fixed shrunk ring 100 to improve the compactness of the combination of the non-metal valve base 20 and the fixed shrunk ring 100.

Figure 4:
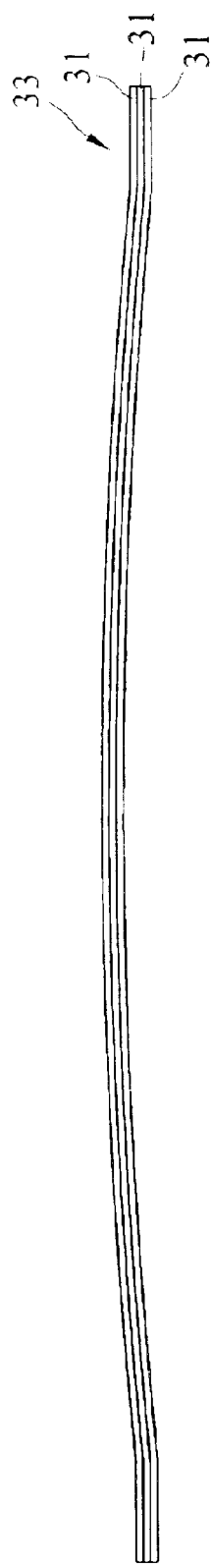
FIG. 4 is a metal diaphragm set produced according to conventional technology.

Referring to FIG. 4 for the sectional view of a metal diaphragm set produced with prior art. The metal diaphragm group 33 consists of two or three pieces of a metal diaphragm 31 of a proper thickness.

The metal diaphragm set is a moving part, which is required to be applied for more than one million times, while the frictions caused by the metal diaphragm 31 and frequent deformations in the course of movement will reduce the application times.

Figure 5:
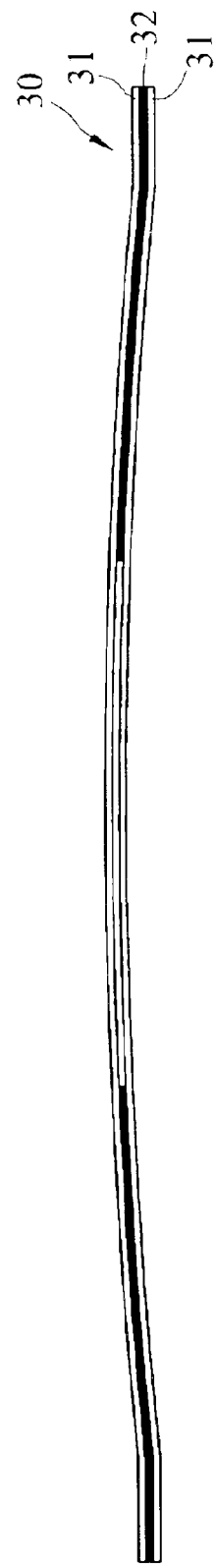
FIG. 5 is the metal dish-type diaphragm set of this invention.

So, this invention replaces the metal diaphragm 31 with a metal ring diaphragm 32 made of soft material, and the material strength of the metal ring diaphragm 32 is less than that of the metal diaphragm 31, such as the annealed bronze, to reduce the metal frictions generated in case of movement of the metal diaphragm 31. As shown in FIG. 5, for keeping the tightness of the metal dish-type diaphragm set 30 and the presser 60, this invention changes the in-between metal diaphragm 31 to the ringlike metal ring diaphragm 32 to reduce metal frictions between the metal diaphragm 31 and to increase the application times of the metal diaphragm 31. The metal ring diaphragm 32 also reduces the deformation of the metal diaphragm 31 generated by pressing the metal dish-type diaphragm set 30 with the presser 60, and reducing the leakage rate of the diaphragm valve.

The diaphragm valve revealed in this invention is provided with the following advantages:

1. Through fastening the screw nuts around the valve body, the metal dish-type diaphragm set is leak free, outer air or dust can't go into the clean air channel, the outboard leakage rate is reduced, and the safety of workers is guaranteed.
2. A fixed taper shrunk ring is used to press the non-metal valve base and extend it, which fits the air flow channel completely.
3. Add flanges on the outer edge of the fixed shrunk ring to avoid the drop off of the non-metal valve base, to fit the non-metal valve base and air flow channel better, and to meet the demand of cleanness.

For the metal dish-type diaphragm set in the invention, the in-between metal diaphragm is annular in the center, which (1) reduces the metal frictions between metal diaphragms, (2) increases the application times, (3) reduces the deformation of the metal diaphragm, generated by pressing the metal dish-type diaphragm set by the presser, and (4) reduces the leakage rate of the diaphragm valve.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A diaphragm valve for controlling inflow and outflow of fluid, comprising:

a valve body with a chamber inside, a first flow channel and a second flow channel for connecting the chamber with the outside;

a non-metal valve base, of ring type and installed in the first flow channel near the chamber, and being a little higher than an internal surface of the valve body;

a fixed shrunk ring, installed in the non-metal valve base to fix the non-metal valve base to the first flow channel;

a metal dish-type diaphragm set, which is installed in the chamber of the valve body above the first flow channel, and which cooperates with the non-metal valve base to block fluid between the first flow channel and the chamber, the metal dish-type diaphragm set including at least three diaphragms with an in-between diaphragm being a ring type and whose intension is less than that of the diaphragms on both sides thereof; and a stem, installed in the valve body near a side of the metal dish-type diaphragm set, and driving the metal dish-type diaphragm set to engage the non-metal valve base in order to block the circulation of fluid between the first flow channel and the chamber, and to release the metal dish-type diaphragm set to allow the fluid to enter the second flow channel via the first flow channel and the chamber.

2. The diaphragm valve of claim 1, wherein the non-metal valve base is made of deformable material for engaging with the metal dish-type diaphragm set.

3. The diaphragm valve of claim 1, wherein the non-metal valve base is made of a high molecular material.

4. The diaphragm valve of claim 1, wherein the fixed shrunk ring is tapered and is surrounded by a plurality of flanges to fit the non-metal valve base with the fixed shrunk ring.

5. The diaphragm valve of claim 1, wherein the metal dish-type diaphragm set is made of a springy metal.

6. The diaphragm valve of claim 1, wherein the in-between diaphragm of the metal dish-type diaphragm set is made of an annealed bronze.

7. A diaphragm valve for controlling inflow and outflow of fluid, comprising:

a valve body with a chamber inside, a first flow channel and a second flow channel for connecting the chamber with the outside;

a non-metal valve base, of ring type and installed in the first flow channel near the chamber, and being a little higher than an internal surface of the valve body;

a fixed shrunk ring, installed in the non-metal valve base to fix the non-metal valve base to the first flow channel;

a metal dish-type diaphragm set, which is installed in the chamber of the valve body above the first flow channel, and which cooperates with the non-metal valve base to block fluid between the first flow channel and the chamber; and a stem, installed in the valve body near a side of the metal dish-type diaphragm set, and driving the metal dish-type diaphragm set to engage the non-metal valve base in order to block the circulation of fluid between the first flow channel and the chamber, and to release the metal dish-type diaphragm set to allow the fluid to enter the second flow channel via the first flow channel and the chamber;

wherein the non-metal valve base is made of a high molecular material; and wherein the high molecular material is polychlorotrifluoroethylene.

8. A diaphragm valve for controlling inflow and outflow of fluid, comprising:

a valve body with a chamber inside, a first flow channel and a second flow channel for connecting the chamber with the outside;

a non-metal valve base, being a ring-type body with a ring-type groove, being installed in the first flow channel near the chamber, and being a little higher than a internal surface of the valve body;

a fixed shrunk ring, installed in the non-metal valve base to fix the non-metal valve base to the first flow channel;

a metal dish-type diaphragm set, which is installed in the chamber of the valve body above the first flow channel, and which cooperates with the non-metal valve base to block the inflow and outflow of fluid between the first flow channel and the chamber, the metal dish-type diaphragm set including at least three diaphragms with an in-between diaphragm being a ring type and whose intension is less than that of the diaphragms on both sides thereof; and a stem, installed in the valve body near a side of the metal dish-type diaphragm set, and driving the metal dish-type diaphragm set to engage the non-metal valve base in order to block the circulation of fluid between the first flow channel and the chamber, and to release the metal dish-type diaphragm set to allow the fluid to enter the second flow channel via the first flow channel and the chamber.

9. The diaphragm valve of claim 8, wherein the non-metal valve base is made of a deformable material for engaging with the metal dish-type diaphragm set.

10. The diaphragm valve of claim 8, wherein the material of the non-metal valve base is a high molecular material.

11. The diaphragm valve of claim 10, wherein the high molecular material is polychlorotrifluoroethylene.

12. The diaphragm valve of claim 8, wherein the fixed shrunk ring is tapered, and is surrounded by a plurality of flanges to fit the non-metal valve base with the fixed shrunk ring.

13. The diaphragm valve of claim 8, wherein the metal dish-type diaphragm set is made of a springy metal.

14. The diaphragm valve of claim 8, wherein the in-between diaphragm of the metal dish-type diaphragm set is made of an annealed bronze.

* * * * *